United States Patent
Vieillard et al.

(10) Patent No.: US 9,849,849 B2
(45) Date of Patent: *Dec. 26, 2017

(54) DEVICE FOR SUPPLYING ELECTRICAL POWER TO AN AIRCRAFT ON THE GROUND

(71) Applicant: LABINAL POWER SYSTEMS, Blagnac (FR)

(72) Inventors: Sebastien Vieillard, La Chapelle Gauthier (FR); Loic Le Duigou, Montrouge (FR)

(73) Assignee: LABINAL POWER SYSTEMS, Blagnac (FR)

( * ) Notice: Subject to any disclaimer, the term of this patent is extended or adjusted under 35 U.S.C. 154(b) by 511 days.

This patent is subject to a terminal disclaimer.

(21) Appl. No.: 14/385,622

(22) PCT Filed: Mar. 14, 2013

(86) PCT No.: PCT/FR2013/050527
§ 371 (c)(1),
(2) Date: Sep. 16, 2014

(87) PCT Pub. No.: WO2013/144479
PCT Pub. Date: Oct. 3, 2013

(65) Prior Publication Data
US 2015/0042155 A1     Feb. 12, 2015

(30) Foreign Application Priority Data
Mar. 30, 2012    (FR) .................................... 12 52957

(51) Int. Cl.
*B60R 16/03*     (2006.01)
*F02N 11/08*     (2006.01)
(Continued)

(52) U.S. Cl.
CPC ........ *B60R 16/0307* (2013.01); *B64C 25/405* (2013.01); *B64D 41/00* (2013.01);
(Continued)

(58) Field of Classification Search
USPC ............................................. 244/50; 307/9.1
See application file for complete search history.

(56) References Cited

U.S. PATENT DOCUMENTS

| | | | |
|---|---|---|---|
| 6,778,414 B2 * | 8/2004 | Chang ....................... | H02J 3/34 363/67 |
| 9,592,907 B2 * | 3/2017 | Vieillard ............... | B64C 25/405 |

(Continued)

FOREIGN PATENT DOCUMENTS

EP         2 243 703         10/2010

OTHER PUBLICATIONS

International Search Report dated Jul. 17, 2013 in PCT/FR13/050527, filed Mar. 14, 2013.

*Primary Examiner* — Rexford Barnie
*Assistant Examiner* — Xuan Ly
(74) *Attorney, Agent, or Firm* — Oblon, McClelland, Maier & Neustadt, L.L.P.

(57) ABSTRACT

A device for supplying electrical power to an aircraft on the ground, including two electric generators driven by an auxiliary power unit. The first generator is connected by a connection/disconnection mechanism to an aircraft network and to an electric taxiing network, to supply either an AC voltage to the aircraft network when it is connected to the aircraft network, or an AC voltage or a power to the taxiing network when it is connected to the taxiing network. The second generator is connected by the connection/disconnection mechanism to the aircraft or taxiing networks to supply the AC voltage to one of those networks.

10 Claims, 4 Drawing Sheets

(51) Int. Cl.
*H02J 4/00* (2006.01)
*H02J 9/06* (2006.01)
*B64C 25/40* (2006.01)
*B64D 41/00* (2006.01)

(52) U.S. Cl.
CPC ............... *F02N 11/08* (2013.01); *H02J 4/00* (2013.01); *H02J 9/061* (2013.01); *B64D 2221/00* (2013.01); *Y02T 50/44* (2013.01); *Y02T 50/823* (2013.01)

(56) References Cited

U.S. PATENT DOCUMENTS

| | | | |
|---|---|---|---|
| 2009/0015063 A1* | 1/2009 | Michalko | H02J 5/00 307/19 |
| 2009/0173821 A1* | 7/2009 | Bhargava | B64C 25/405 244/50 |
| 2010/0276535 A1 | 11/2010 | Charuel et al. | |
| 2011/0290933 A1* | 12/2011 | Cros | B64C 25/405 244/50 |
| 2014/0138479 A1 | 5/2014 | Vieillard et al. | |

* cited by examiner

DEVICE FOR SUPPLYING ELECTRICAL POWER TO AN AIRCRAFT ON THE GROUND

This invention relates to a device for supplying electrical power to an aircraft on the ground, comprising at least two electric networks: an electric aircraft network, in particular for supplying the cabin and the cockpit of the aircraft, and an electric taxiing network.

Applications FR 10/55457 and FR 10/59612 of the applicant respectively describe a device for supplying the electric network of an aircraft, and an electrical architecture for the processing of the power regenerated by electric actuators during the taxiing operations of an aircraft.

The taxiing of an aircraft is the circulation or the rolling of this aircraft on the ground, by the intermediary of the wheels of the landing gear of the aircraft. The taxiing is said to be electric when the wheels of at least one landing gear of the aircraft (in general the wheels of the main landing gear) are driven by electric motors, which are part of the taxiing network.

The aircraft and taxiing networks are supplied by at least one generator driven by an Auxiliary Power Unit (APU).

In the current state of the art, this auxiliary power unit is started by the intermediary of an independent starter supplied by a battery, and comprises a drive output shaft of the aforementioned generator.

Several electrical architectures have been proposed for supplying aircraft and taxiing networks, using the power supplied by the auxiliary power unit.

A first electrical architecture of prior art comprises two electric generators driven by the auxiliary power unit. The first generator supplies an AC voltage Vac1 (230V) to the taxiing network and the second generator supplies an AC voltage Vac2 (115V) to the aircraft network. The taxiing network comprises a motor control unit (called MCU) for controlling the electric motors for driving the wheels of the aircraft, which is connected to the first generator by connection/disconnection means.

The advantage of this architecture is that the taxiing and aircraft networks are independent from one another and are supplied by separate generators. The validation constraints for the certification of the aircraft network (of the ATA 24 type) therefore do not affect the taxiing network, which can include a simplified motor control unit, which reduces the weight of this unit (by about 50 kg).

However, the two aforementioned generators have relatively substantial electrical power, respectively 120 kVA and 90 kVA, which is added to the electrical power of the starter of the auxiliary power unit. The electrical power onboard the aircraft is therefore relatively substantial. Due to their high electrical power, generators are heavy and cumbersome, and it can be difficult and even impossible to mount them on the output shaft of the auxiliary power unit.

In a second electrical architecture of prior art, the aircraft and taxiing networks are supplied by a common generator with high electrical power (150 kVA), which is driven by the auxiliary power unit. This generator supplies an AC voltage Vac2 (115V) to the aircraft and taxiing networks, which are connected to the generator by connection/disconnection means. The taxiing network comprises a motor control unit connected to the electric motors for driving the wheels of the aircraft.

The disadvantage of this electrical architecture is that the taxiing network must meet all of the network standards (of the ATA 24 type for example) that apply to the aircraft and is supplied by the voltage Vac2 of 115V. The motor control unit of the taxiing network comprises a power conversion function that makes it possible to increase the level of voltage without polluting the aircraft network. This function is in general provided by an ATRU (Auto Transformer Rectifier Unit) module, which results in a significant increase in the weight of the unit (by a magnitude of 50 to 100 kg).

It has also been proposed, in another known electrical architecture, to supply the taxiing network of an aircraft by means of at least one generator driven by a motor of the aircraft, with the electric aircraft network being supplied by another generator driven by an auxiliary power unit. However, this architecture requires operating a motor, which results in a substantial reduction in the gains in the consumption of kerosene expected for the electric taxiing function of an aircraft.

The invention has in particular for purpose to simply, effectively and economically reduce or eliminate at least one portion of the aforementioned disadvantages of prior art, thanks to a new electrical architecture for the electric taxiing of an aircraft.

It proposes for this purpose a device for supplying electrical power to an aircraft on the ground, comprising two electric generators driven by an auxiliary power unit, with the first generator being intended to supply an electric taxiing network that comprises electric motors for driving the wheels of the aircraft, and the second generator being intended to supply an electric aircraft network, characterised in that the first generator is connected by selective connection/disconnection means to the aircraft and taxiing networks, in order to supply a first AC voltage Vac2 to the aircraft network when it is connected to this network, or a higher AC voltage Vac1 or a power P to the taxiing network when it is connected to this network, and in that the second generator is connected by selective connection/disconnection means to the aircraft and taxiing networks and is able to supply said first AC voltage Vac2 to the network to which it is connected.

In the device according to the invention, the first generator driven by the auxiliary power unit is used to supply the taxiing network when the aircraft must roll on the ground, and for supplying the aircraft network when the taxiing network is not supplied. This first generator referred to as "hybrid" is able to selectively supply a voltage Vac1 for supplying the taxiing network or a voltage Vac2 for supplying the aircraft network. Alternatively, the first generator can selectively supply a power P for supplying the taxiing network, or a voltage Vac2 for supplying the aircraft network. The second generator is used to supply the aircraft network when the first generator is supplying the electric taxiing network. This second generator is advantageously dimensioned in order to provide solely the needs of the aircraft on the ground, which makes it possible to reduce the electrical power onboard and therefore the volume installed in the aircraft. The connection/disconnection means are controlled to connect, during the taxiing, the first generator to the taxiing network (for its supplying with voltage Vac1 or with power P) and the second generator to the aircraft network (for its supplying with voltage Vac2), and to connect, during the other operating phases of the aircraft, the first generator to the aircraft network for its supplying with voltage Vac2, the second generator then being stopped.

According to a characteristic of the invention, the second generator is used to supply the taxiing network when the first generator is defective or has broken down. There is therefore redundancy of the means for the electric supply of the taxiing network. The connection/disconnection means are controlled to connect the second generator to the taxiing network (for its supplying with voltage Vac2) when a failure of the first generator is detected, for example by its control means of the GCU (Generator Control Unit) type.

In the aforementioned case, the taxiing network is supplied with the voltage Vac2 which is lower than the voltage Vac1. Although the power supplied by the second generator may not be sufficient for an optimum use of the taxiing, it is however sufficient to provide in particular the reverse function for taxiing, which does not require relative substantial power. The invention as such makes it possible to provide the availability of the reverse function of the taxiing network, even in the case of a breakdown of its main generator. The reliability of the taxiing function is as such no longer limited by the reliability of its main generator, as a secondary generator remains available to supply the taxiing network.

The invention makes it possible to design the taxiing network without the constraints imposed by the standards that apply to the network proper to the aircraft of the ATA 24 type and to reduce the constraints of harmonic pollution associated with the taxiing function.

According to a characteristic of the invention, one of the two generators is a starter/generator able to start the auxiliary power unit and can as such replace the independent starter used in prior art, which represents a significant gain in weight. In addition, this starter/generator is mounted on the auxiliary power unit in the location of the starter (i.e. on the pinion of the unit generally dedicated to the starter in prior art) and therefore does not hinder the mounting of the other generator on the output shaft of the auxiliary power unit.

The device according to the invention further comprises a motor control unit which is connected to the starter/generator for the controlling of the starting of the auxiliary power unit. This unit can comprise control means of the GCU (Generator Control Unit) type which regulate the output current or voltage of the starter/generator and protect it in the case of an electrical overload.

The first generator is more preferably a three-stage synchronous generator with wound rotor excitation. The variation in the rotor excitation makes it possible either to vary the output voltage of the generator, between the values Vac1 and Vac2, or to switch from a voltage generator (delivering a substantially constant AC voltage Vac2) to a current/power generator delivering a current or a power, according to the substantially constant taxiing need, for example a power of 150 kW.

The first generator can supply a voltage of 115 Vac (Vac2) and a power of 90 kVA when it is connected to the aircraft network or a voltage of 230 Vac (Vac1) and a power of 150 kW (case of a voltage or power regulated generator) when it is connected to the taxiing network.

The second generator can supply enough electrical power to supply the aircraft on the ground, and a voltage Vac2 of 115V at 400 Hz. The second generator is then dimensioned to cover the electrical needs on the ground of the aircraft and no longer for the entire flight cycle. The onboard electrical power in the aircraft for its operation on the ground is therefore clearly less than that used in prior art, described hereinabove. Moreover, due to its low electrical power, the second generator is not very cumbersome and can be driven with the first generator by the output shaft of the auxiliary power unit. The power (transient or not) of the second generator is however sufficient to supply the reverse function of the taxiing network.

This invention also relates to a method for supplying electrical power to an aircraft on the ground, by means of a device such as described hereinabove, characterised in that it comprises a step consisting in supplying the taxiing network by means of the first generator and the aircraft network by means of the second generator, and a step consisting in supplying the aircraft network by means of the first generator when the taxiing function is not used, the second generator then being out of service.

Advantageously, the first generator is a three-stage synchronous generator with wound rotor excitation, and the excitation of this generator is controlled by a motor control unit in order to switch from a voltage generator Vac1 to a voltage generator Vac2 or from a generator of power P to a voltage generator Vac2.

The method more preferably comprises a step consisting in supplying the taxiing network by the second generator when the first generator is defective.

The invention shall be better understood and other characteristics, details and advantages of the latter shall appear more clearly when reading the following description, provided as a non-restricted example and in reference to the annexed drawings, wherein.

Figure 1:
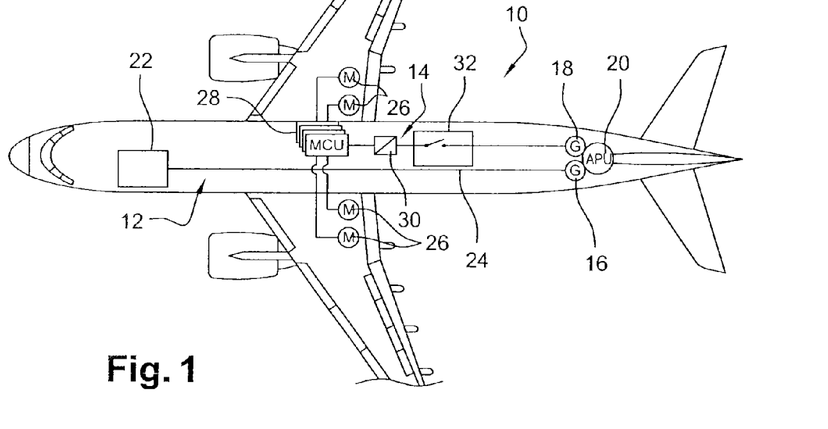
FIGS. 1 and 2 each diagrammatically show a device for supplying electrical power to an aircraft according to prior art.

Reference is first made to FIG. 1 which shows an aircraft provided with a device 10 of prior art for supplying electrical power to an aircraft network 12, in particular for supplying equipment in the cockpit and passenger cabins of the aircraft, and an electric taxiing network 14.

Each network 12, 14 is supplied by an electric generator 16, 18 driven by an auxiliary power unit 20, designated by the acronym APU (Auxiliary Power Unit) in what follows.

The APU 20 is located at the rear of the fuselage of the aircraft and comprises a drive output shaft (not shown) of the rotors of the generators 16, 18. The APU 20 is provided with an independent starter (not shown), which is connected to a battery and to means for controlling the starting of the APU.

The generator 16 has an electrical power of 90 kVA and supplies an AC voltage Vac2 of 115v to the network 12, with the latter diagrammatically shown in FIG. 1 by a primary distribution unit 22 connected by an electrical harness 24 to the generator 16.

The generator 18 has an electrical power of 120 kVA and supplies an AC voltage Vac1 of 230v to the taxiing network 14, which is diagrammatically shown by four motors (M) 26, connected to a motor control unit (MCU) 28, which is itself connected by a rectifier 30 to the generator 18. The output of the generator 18 is connected to the taxiing network 14 by connection/disconnection means 32 which make it possible to isolate the generator from the taxiing network 14 when the taxiing function is not sought, for example when the aircraft is in flight.

This electrical architecture has the disadvantages described hereinabove, which are primarily due to the relatively substantial electrical power of the generators 16, 18 (respectively 90 kVA and 120 kVA), to their weight and to their encumbrance.

Figure 2:
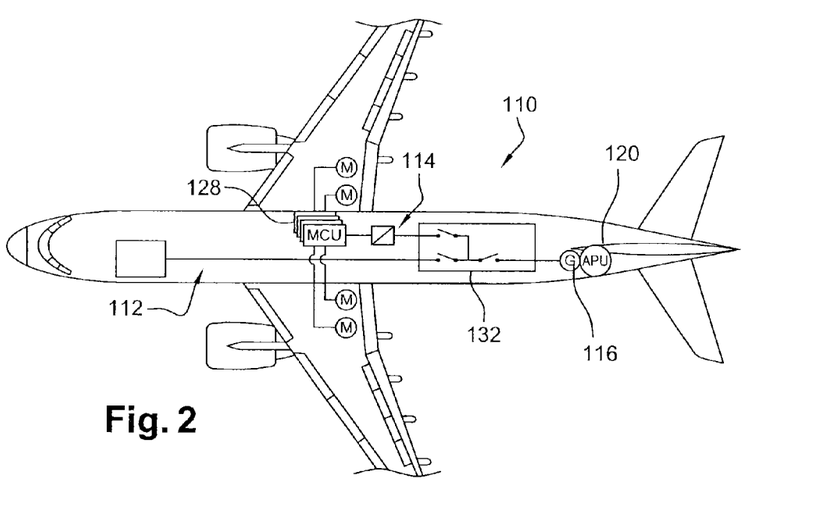

FIG. 2 shows an aircraft provided with another device 110 of prior art for supplying electrical power to the aircraft network 112 and the taxiing network 114.

The networks 112, 114 are supplied by a common electric generator 116 which is driven by an APU 120.

The output of the generator 116 is connected to the networks 112, 114 by connection/disconnection means 132 and supplies to these networks an AC voltage Vac2 of 115v.

The motor control unit (MCU) 128 of the taxiing network 114 comprises an ATRU (Auto Transformer Rectifier Unit) module for converting power which makes it possible to increase the level of voltage supplied by the generator 116.

This other electrical architecture also has disadvantages, which are primarily due to the fact that the ATRU module results in a significant increase in the weight of the motor control unit (MCU) 128, and that the taxiing network 114 must meet all of the certification standards that apply to the network 112 of the aircraft 12 (of the ATA 24 type).

The invention makes it possible to overcome at least one portion of the disadvantages of prior art thanks to the supplying of the taxiing network and of the network proper to the aircraft by means of two generators, of which one is "hybrid", with each of these generators making it possible to selectively supply these two networks.

Figure 3:
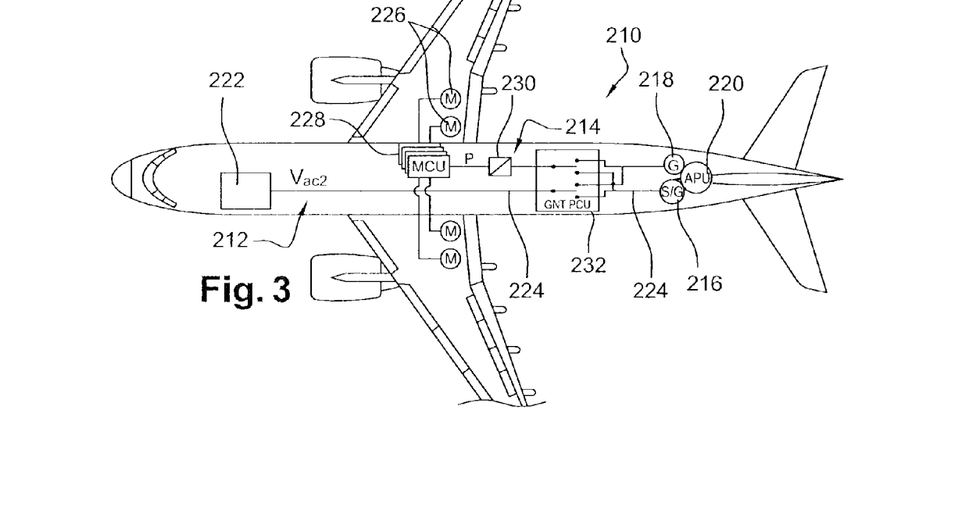
FIG. 3 diagrammatically shows a device for supplying electrical power to an aircraft according to this invention.

FIG. 3 shows a preferred embodiment of the device 210 according to the invention, wherein an APU 220, located at the rear of the fuselage of an aircraft, drives the rotors of two independent electric generators 216, 218.

The output of the generator 216 is connected by connection/disconnection means 232 to the input of a primary distribution unit 222 of the aircraft network, with the output or outputs of this unit 222 being for example connected to equipment in the cockpit and to various compartments of the fuselage of the aircraft. The electrical connections between the unit 222, the means 232 and the generator 216 are established by electrical harnesses 224.

The generator 216 has an electrical power between 30 and 40 kVA and supplies to the aircraft and taxiing networks 212, 214 an AC voltage Vac2, which is for example 115V at 400 Hz.

The output of the generator 218 is connected by connection/disconnection means 232 to the input of a rectifier 230 of the taxiing network, with the output of the rectifier 230 being connected to the input of a motor control unit (MCU) 228 which supplies motors 226 for driving the wheels of the main landing gear of the aircraft. These motors 226 can be of a number of four.

In the example shown, the connection/disconnection means 232 of the generators 216, 218 with the networks 212, 214 are formed by a common GNTPCU unit (Green Taxiing Power Control Unit) comprising contactors or similar items able to establish electrical connections between the generator 218 and the taxiing network 214, between the generator 218 and the aircraft network 212, between the generator 216 and the aircraft network 212, and between the generator 216 and the taxiing network 214. The GNTPCU unit makes it possible to manage the electrical configurations of the aircraft by means of contactors and further comprises at least one card of the GCU (Generator Control Unit) type in order to control the excitation of the generator 218, as shall be described in what follows.

The generator 218 has an electrical power of a magnitude of 90 kVA for example and is able to supply the taxiing network 214 and the aircraft network 212.

Figure 3A:
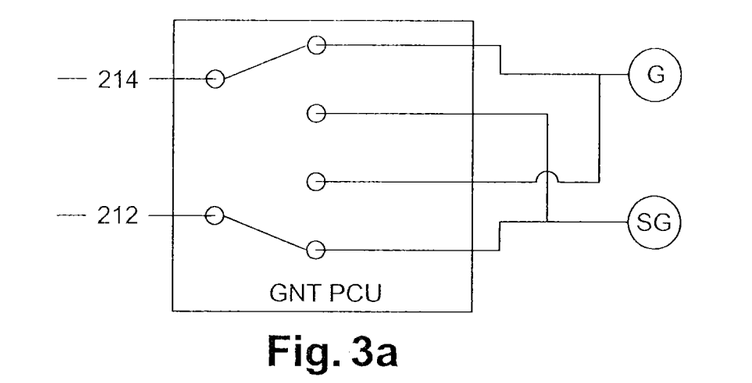
FIGS. 3a, 3b and 3c diagrammatically show connection/disconnection means of the device according to the invention, and show steps of the method according to the invention of supplying the taxiing and aircraft networks, the aircraft network, and the taxiing network, respectively.
Figure 3B:
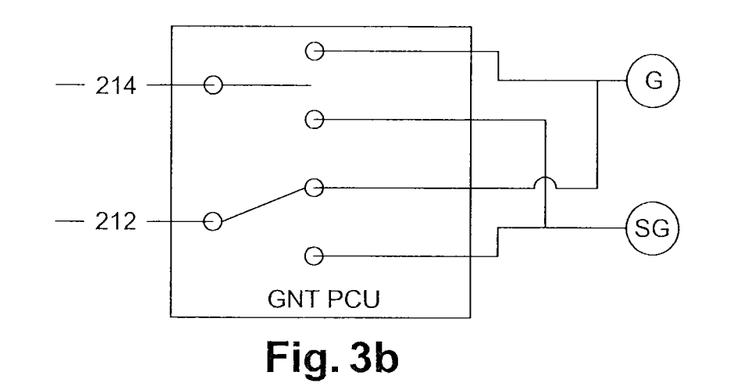

When the taxiing function is not used, the output of the generator 218 is connected by the means 232 to the aircraft network 212 and supplies to this network an AC voltage Vac2, which is for example 115v at 400 Hz. The output of the generator 218 can be disconnected from the taxiing network 214 by the intermediary of means 232. The output of the generator 216 can also be disconnected from the network 212 by the intermediary of means 232. The contactors of the GNTPCU case are then in the positions such as shown in FIG. 3b.

When the taxiing function must be used, the output of the generator 216 is connected by the means 232 to the aircraft network 212 and supplies to this network an AC voltage Vac2, which is for example 115v at 400 Hz. The output of the generator 218 is connected by the means 232 to the taxiing network 214 and supplies to this network an AC voltage Vac1, which is for example 230v at 400 Hz, or a power P, which is for example 150 kW at 230v. The contactors of the GNTPCU unit are then in the positions such as shown in FIG. 3a.

Figure 3C:
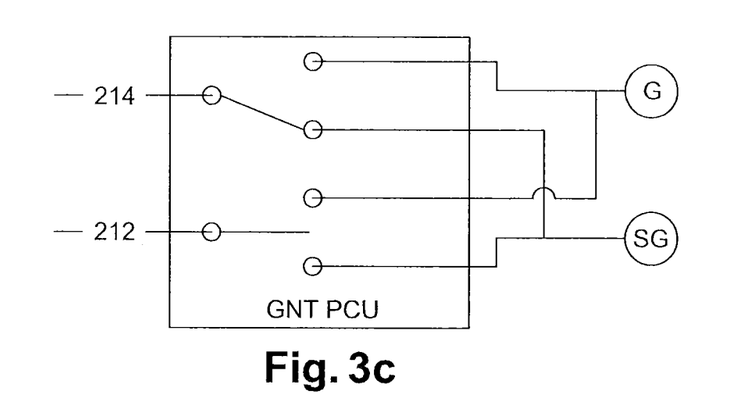

When the taxiing function must be used but the generator 218 has broken down or is defective, the output of the generator 216 is connected by the means 232 to the taxiing network 214 and supplies to this network the AC voltage Vac2. This voltage is sufficient to control the reverse function of the taxiing network. The output of the generator 218 can be disconnected from the taxiing network 214 by the intermediary of means 232. The contactors of the GNTPCU unit are then in the positions such as shown in FIG. 3c.

The rectifier 230 is of the AC/DC type and makes it possible to convert the AC voltage Vac1 into DC Vdc1 or the voltage Vac2 into direct voltage Vdc2. The MCU unit 228 can include contactors and at least one power convertor each comprising one or several inverters. Advantageously, these inverters operate simply in current switching mode when the generator 218 is providing a current or a power to the taxiing network 214.

The generator 216 is more preferably a starter/generator (S/G), which can be used in "motor" mode when it is supplied with power, in order to start the APU 220. This makes it possible to suppress the starter that was dedicated to starting the APU in prior art. The low-power generator 216 is mounted on the APU 220 in the location of the original starter, which makes it possible to avoid hindering the installing of the generator 218 on the output shaft of the APU 220.

Alternatively, it is the generator 218 which is used to start the APU 220. The generator 218, which is able to selectively supply two voltages Vac1 and Vac2 or a voltage Vac2 and a power P, is advantageously a three-stage synchronous generator with wound rotor excitation, of which the operating principle is diagrammatically shown in FIG. 4.

Figure 4:
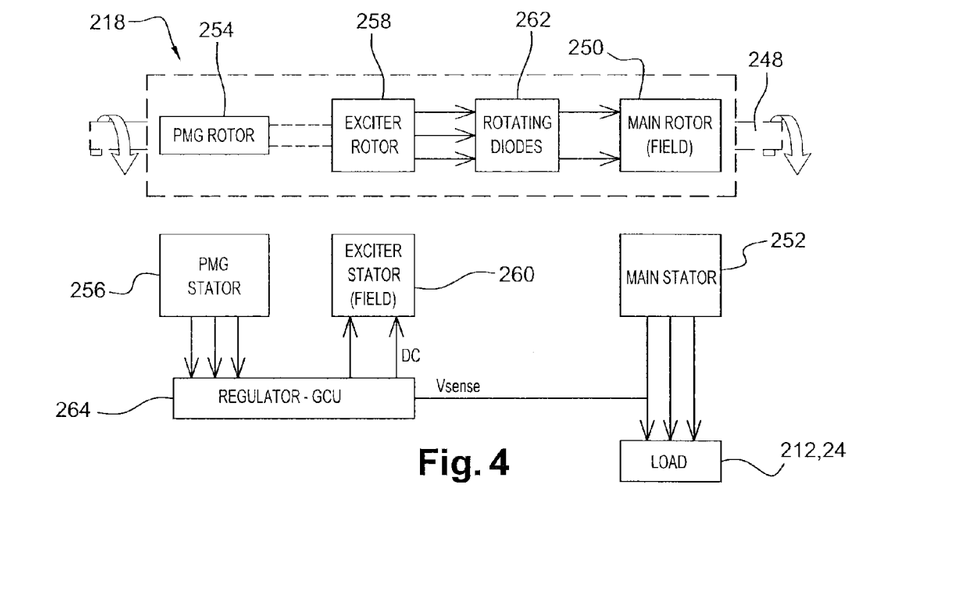
FIG. 4 diagrammatically shows a three-stage synchronous generator with wound rotor excitation according to the invention.

The generator 218 comprises a main wound rotor 250 driven by the output shaft 248 of the APU inside a main wound stator 252. The generator 218 is of the three stage type (three rotor/stator units) and comprises in addition to the main rotor 250/main stator 252 unit, a rotor 254 and a stator 256 with permanent magnets and a rotor 258 and a stator 260 of an exciter, with the rotors 254, 258 with permanent magnets and the exciter being integral with the output shaft 248 of the APU.

The output of the rotor 258 of the exciter is connected to the input of a diode rectifier 262, which is integral with the shaft 248, and for which the output is connected to the input of the main rotor 250.

The input of the stator 260 of the exciter and the output of the stator 256 with permanent magnets are connected to means 264 for regulating and for controlling comprising at least one GCU card which regulated the current or the voltage of the generator 218 and protects in case of an electrical overload. These means 264 are also connected to the output of the main stator 252 and comprise means for detecting voltage or current delivered to the networks 212, 214 of the aircraft. The means 264 can be housed in the GNTPCU unit.

The generator 218 can as such operate in the following manner.

The output shaft 248 of the APU 220 drives the main rotor 250 of the generator 218 at a predetermined speed. The means 264 for regulating and for controlling regulate the supply to the stator 260 of the exciter in such a way as to generate an electromagnetic field that induces a current in the rotor 258 of the exciter, with this current exiting the rotor 258 and being rectified by the rectifier 262 before supplying the main rotor 250 in order to induce a given voltage or a current in the main stator 252 of the third stage of the generator. The rotor 254 and the stator 256 with permanent magnets make it possible in particular to report the rotating speed of the shaft 248 to the means 264.

The main rotor 250 induces a current or a voltage in the main stator 252 which is intended to supply one or the other of the aforementioned networks 212, 214. The means 264 control the excitation of the generator 218 according to the voltage or current detected at the output of this generator, in such a way that the latter delivers a defined voltage (VAc1 or Vac2) that is substantially constant or that can possibly vary in order to supply in particular the taxiing network and either which can be assimilated to a voltage generator, or delivers a current or a power that is substantially constant and which can be assimilated to a current/power generator in order to supply in particular the taxiing network.

The variation in the excitation of the generator 218 makes it possible to switch from a mode for regulating the voltage Vac2 (for the supplying of the network 212 with Vac2, for example 115V) to a mode for regulating the power P (for the supplying of the network 214 with power P, for example 150 kW), or from a mode for regulating the voltage Vac2 (for the supplying of the network 212 with Vac2, for example 115V) to a mode for regulating the voltage Vac1 (for the supplying of the network 214 with voltage Vac1, for example 230V).

The generator 218 more preferably supplies a voltage of 115 Vac and a power of 90 kVA when it is connected to the aircraft network, and a power of 150 KW when it is connected to the taxiing network.

Figure 5:
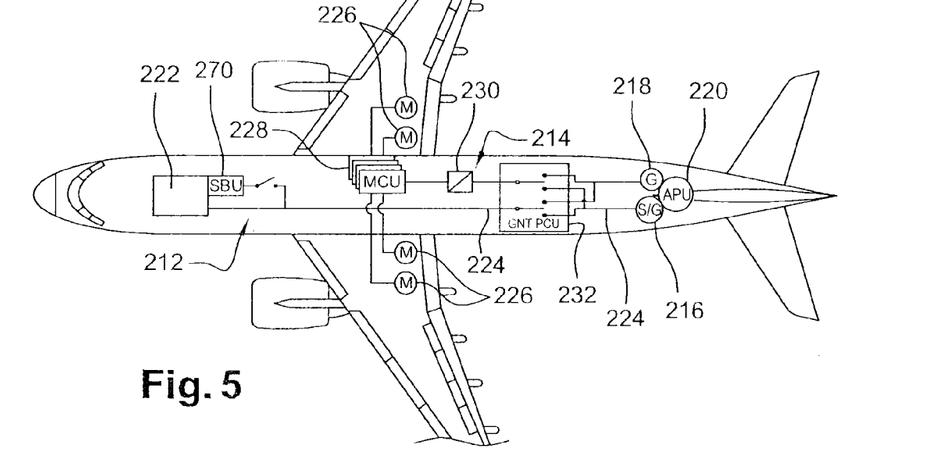
FIGS. 5 and 6 diagrammatically show alternative embodiments of the device for supplying electrical power according to the invention.

In the alternative embodiment of FIG. 5, a motor control unit 270 of the SBU (Starter Box Unit) type is connected to the harness 224, in parallel of the unit 222. This unit 270 is used to control the starting of the APU 220 by the intermediary of the starter/generator 216 or 218. In this case, the logic for controlling the contactors of the GNTPCU unit (means 232) can be adapted in consequence.

Figure 6:
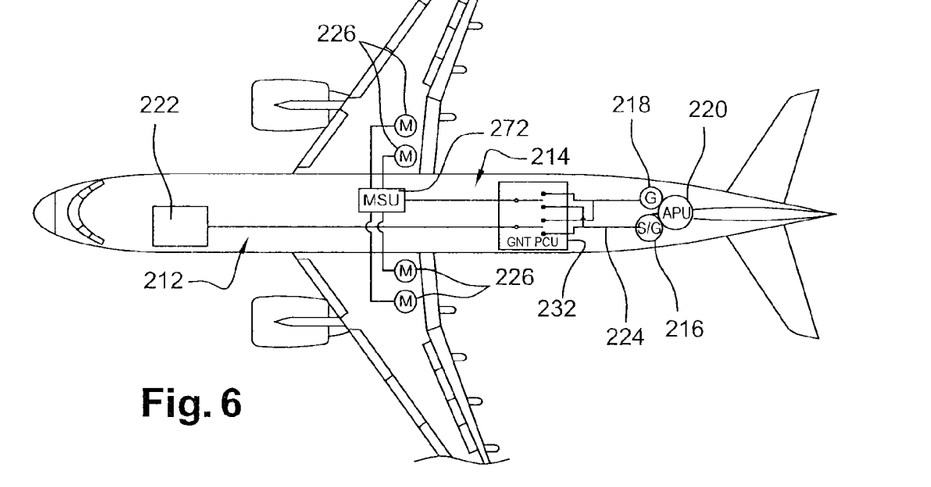

The alternative embodiment of FIG. 6 differs from that of FIG. 4 in that the MCU unit is replaced with an MSCU or MSU 272 unit (Motor Starter Unit). This MSU unit 272 integrates a portion of the power electronics of the GNTPCU unit in order to control the starting of the APU 220 by the intermediary of the starter/generator 216 or 218.

The electrical system for starting the APU which is used in this invention can be of the type described in application WO-A2-2010/079308 of the applicant.

In another alternative embodiment not shown, the taxiing network comprises a number of motors (M) 226 different from four, and for example two.

The invention claimed is:

1. A device for supplying electrical power to an aircraft on the ground, comprising:
   two electric generators driven by an auxiliary power unit, the first generator configured to supply an electric taxiing network that comprises electric motors for driving wheels of the aircraft, and the second generator configured to supply an electric aircraft network;
   wherein the first generator is connected by selective connection/disconnection means to the aircraft network and the taxiing network, said first generator being configured to supply a first AC voltage to the aircraft network when said first generator is connected to the aircraft network, and wherein said first generator is configured to supply a higher AC voltage or a power to the taxiing network when said first generator is connected to the taxiing network; and
   wherein the second generator is connected by selective connection/disconnection means to the aircraft and taxiing networks, said second generator being configured to supply the first AC voltage to the aircraft network when said second generator is connected to said aircraft network, and wherein said second generator is configured to supply the first AC voltage to the taxing network when said second generator is connected to said taxiing network.

2. A device according to claim 1, wherein one of the generators is a starter/generator configured to start the auxiliary power unit.

3. A device according to claim 2, further comprising a motor control unit connected to the starter/generator for controlling starting of the auxiliary power unit.

4. A device according to claim 1, wherein the first generator is a three-stage synchronous generator with wound rotor excitation.

5. A device according to claim 1, wherein the first generator supplies a voltage of 115 Vac at 400 Hz and a power of 90 kVA when it is connected to the aircraft network.

6. A device according to claim 1, wherein the first generator provides a power of 150 kW when it is connected to the taxiing network.

7. A device according to claim 1, wherein the second generator supplies an electric power for supplying electric charges to an aircraft on the ground, and a voltage of 115 Vac at 400 Hz.

8. A method for supplying electrical power to an aircraft on ground by a device according to claim 1, the method comprising:
   supplying the taxiing network by the first generator and the aircraft network by the second generator; and
   supplying the aircraft network by the first generator when the taxiing function is not used, with the second generator then being out of service.

9. A method according to claim 8, wherein the first generator is a three-stage synchronous generator with wound rotor excitation, and the excitation of the first generator is controlled by a motor control unit to switch from a voltage generator to a voltage generator or from a generator of power to a voltage generator.

10. A method according to claim 8, further comprising supplying the taxiing network by the second generator when the first generator is defective.

\* \* \* \* \*

UNITED STATES PATENT AND TRADEMARK OFFICE
CERTIFICATE OF CORRECTION

PATENT NO. : 9,849,849 B2  
APPLICATION NO. : 14/385622  
DATED : December 26, 2017  
INVENTOR(S) : Sebastien Vieillard et al.

Page 1 of 1

It is certified that error appears in the above-identified patent and that said Letters Patent is hereby corrected as shown below:

In the Claims

In Column 8, Line 32, change "taxing" to --taxiing--.

Signed and Sealed this
Sixteenth Day of July, 2019

Andrei Iancu
*Director of the United States Patent and Trademark Office*